US012455702B2

(12) United States Patent
Kim et al.

(10) Patent No.: US 12,455,702 B2
(45) Date of Patent: Oct. 28, 2025

(54) ELECTRONIC DEVICE FOR SELECTIVELY COMPRESSING AND DECOMPRESSING FILES BASED ON FREE SPACE AND USE FREQUENCY

(71) Applicant: Samsung Electronics Co., Ltd., Suwon-si (KR)

(72) Inventors: Hyeongjun Kim, Suwon-si (KR); Sungjong Seo, Suwon-si (KR); Woojoong Lee, Suwon-si (KR); Sungdo Moon, Suwon-si (KR); Hyunjoon Cha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/347,197

(22) Filed: Jul. 5, 2023

(65) Prior Publication Data
US 2023/0342074 A1 Oct. 26, 2023

Related U.S. Application Data

(63) Continuation of application No. PCT/KR2022/000406, filed on Jan. 11, 2022.

(30) Foreign Application Priority Data

Jan. 12, 2021 (KR) .......... 10-2021-0003838

(51) Int. Cl.
*G06F 12/00* (2006.01)
*G06F 3/06* (2006.01)

(52) U.S. Cl.
CPC .......... *G06F 3/0655* (2013.01); *G06F 3/0608* (2013.01); *G06F 3/067* (2013.01)

(58) Field of Classification Search
CPC ...... G06F 3/0655; G06F 3/0608; G06F 3/067; G06F 3/064; G06F 3/0679;
(Continued)

(56) References Cited

U.S. PATENT DOCUMENTS 5,675,789 A * 10/1997 Ishii .................. G06F 3/0643
708/203
6,038,571 A 3/2000 Numajiri et al.
(Continued)

FOREIGN PATENT DOCUMENTS

| CN | 103218224 A | 7/2013 |
| CN | 108363727 A | 8/2018 |

(Continued)

OTHER PUBLICATIONS

Extended European Search Report dated Apr. 23, 2024, issued in European Patent Application No. 22739609.1203.
(Continued)

*Primary Examiner* — Arvind Talukdar
(74) *Attorney, Agent, or Firm* — Jefferson IP Law, LLP

(57) ABSTRACT

An electronic device is provided. The electronic device includes a storage, and a processor configured to execute a storage device manager function, when the storage device manager function is executed, check a free space on a file system, as a result of the checking of the free space, determine whether the free space of the storage is less than or equal to a first reference ratio, when the free space of the storage is less than or equal to the first reference ratio, select and compress data having a use frequency less than or equal to a predetermined use frequency, manage the compressed data by using a list, and reserve and process a block secured by the compression on the file system.

14 Claims, 11 Drawing Sheets

(58) Field of Classification Search
CPC ............ G06F 16/1737; G06F 16/1744; G06F 16/1727; G06F 3/0643; G06F 3/0653; G06F 16/16; G06F 16/1734; G06F 3/06; G06F 11/1446; G06F 12/00; G06F 13/16
See application file for complete search history.

(56) References Cited

U.S. PATENT DOCUMENTS

| | | | |
|---|---|---|---|
| 9,880,743 B1* | 1/2018 | Armangau | G06F 3/0631 |
| 10,698,811 B2 | 6/2020 | Cho | |
| 10,782,880 B2 | 9/2020 | Kim et al. | |
| 2004/0122873 A1 | 6/2004 | Wright, Jr. et al. | |
| 2012/0131266 A1 | 5/2012 | Cho et al. | |
| 2016/0306583 A1 | 10/2016 | Yun et al. | |
| 2017/0371593 A1* | 12/2017 | Li | G06F 3/0608 |
| 2019/0235758 A1* | 8/2019 | Constantinescu | G06F 3/0643 |
| 2020/0089784 A1* | 3/2020 | Li | G06F 3/0608 |
| 2020/0249877 A1 | 8/2020 | McIlroy et al. | |

FOREIGN PATENT DOCUMENTS

| | | |
|---|---|---|
| JP | 07-319760 A | 12/1995 |
| JP | 2000-066844 A | 3/2000 |
| JP | 6405736 B2 | 9/2018 |
| KR | 10-2007-0108646 A | 11/2007 |
| KR | 10-2012-0054699 A | 5/2012 |
| KR | 10-2016-0122413 A | 10/2016 |
| KR | 10-2019-0045049 A | 5/2019 |
| KR | 10-2019-0141304 A | 12/2019 |

OTHER PUBLICATIONS

International Search Report dated Apr. 19, 2022, issued in an International Application No. PCT/KR2022/000406.

* cited by examiner

ELECTRONIC DEVICE FOR SELECTIVELY COMPRESSING AND DECOMPRESSING FILES BASED ON FREE SPACE AND USE FREQUENCY

CROSS-REFERENCE TO RELATED APPLICATION(S)

This application is a continuation application, claiming priority under § 365(c), of an International application No. PCT/KR2022/000406, filed on Jan. 11, 2022, which is based on and claims the benefit of a Korean patent application number 10-2021-0003838, filed on Jan. 12, 2021, in the Korean Intellectual Property Office, the disclosure of which is incorporated by reference herein in its entirety.

BACKGROUND

1. Field

The disclosure relates to an electronic device and a method of operating a storage of an electronic device.

2. Description of Related Art

Electronic devices, such as smartphones, tablet personal computer (PCs), portable multimedia players (PMPs), personal digital assistants (PDAs), laptop personal computers, and wearable devices, which have been developed recently, may perform not only mobility but also various functions (e.g., functions of executing games, social network services (SNS), the Internet, and multimedia and taking and running photograph videos).

The electronic devices may include storage devices, such as not and (NAND) flash memories or solid state disks (SSDs) to store high-capacity data required to perform various functions.

The above information is presented as background information only to assist with an understanding of the disclosure. No determination has been made, and no assertion is made, as to whether any of the above might be applicable as prior art with regard to the disclosure.

SUMMARY

An electronic device may manage an operation of a storage device to reduce performance degradation caused by a lack of a free space of the storage device.

Aspects of the disclosure are to address at least the above-mentioned problems and/or disadvantages and to provide at least the advantages described below. Accordingly, an aspect of the disclosure is to provide an electronic device and a method of operating a storage of a storage device of an electronic device, which ensure a free space with a predetermined ratio.

Additional aspects will be set forth in part in the description which follows and, in part, will be apparent from the description, or may be learned by practice of the presented embodiments.

In accordance with an aspect of the disclosure, an electronic device is provided. The electronic device includes a storage, and a processor configured to execute a storage device manager function, check a free space on a file system when the storage device manager function is executed, determine whether a result of checking the free space indicates that the free space of the storage is equal to or less than a first reference ratio, select and compress data having a use frequency equal to or less than a predetermined use frequency when the free space of the storage is equal to or less than the first reference ratio, manage the compressed data by using a list, and reserve and process a block ensured by compression on the file system.

In accordance with another aspect of the disclosure, a method of managing a storage of an electronic device is provided. The method includes executing a storage device manager function, periodically checking a free space on a file system when the storage device manager function is executed, determining whether a result of checking the free space indicates that the free space of the storage is equal to or less than a first reference ratio, selecting and compressing data having a use frequency equal to or less than a predetermined use frequency when the free space of the storage is equal to or less than the first reference ratio, managing the compressed data by using a list, and reserving and processing a block ensured by compression on the file system.

The electronic device and the method of operating the storage of the storage device of the electronic device according to the disclosure may ensure the free space of the storage device, thereby reducing performance degradation of the storage device included in the electronic device.

Other aspects, advantages, and salient features of the disclosure will become apparent to those skilled in the art from the following detailed description, which, taken in conjunction with the annexed drawings, discloses various embodiments of the disclosure

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
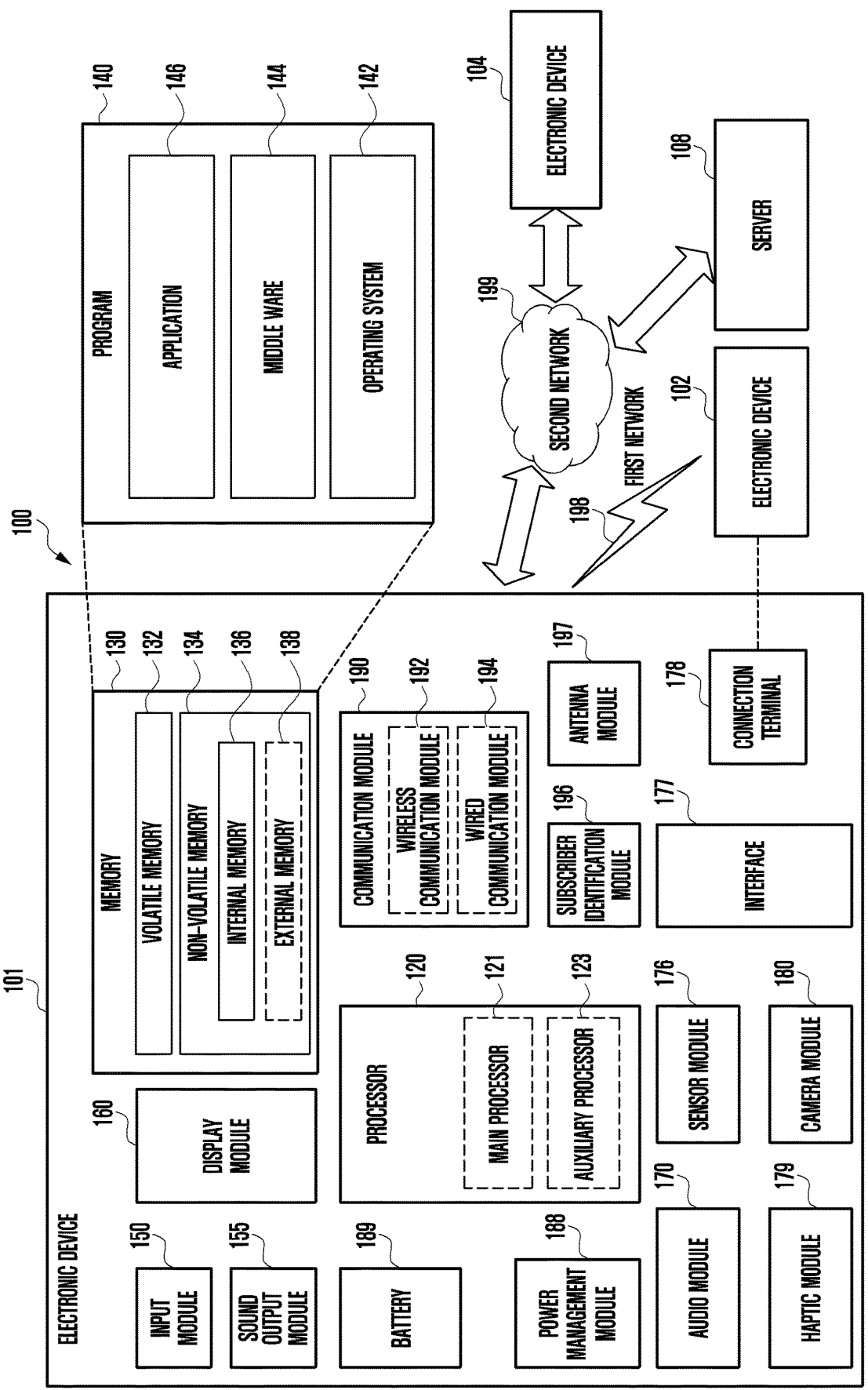
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multipleoutput (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

Figure 2:
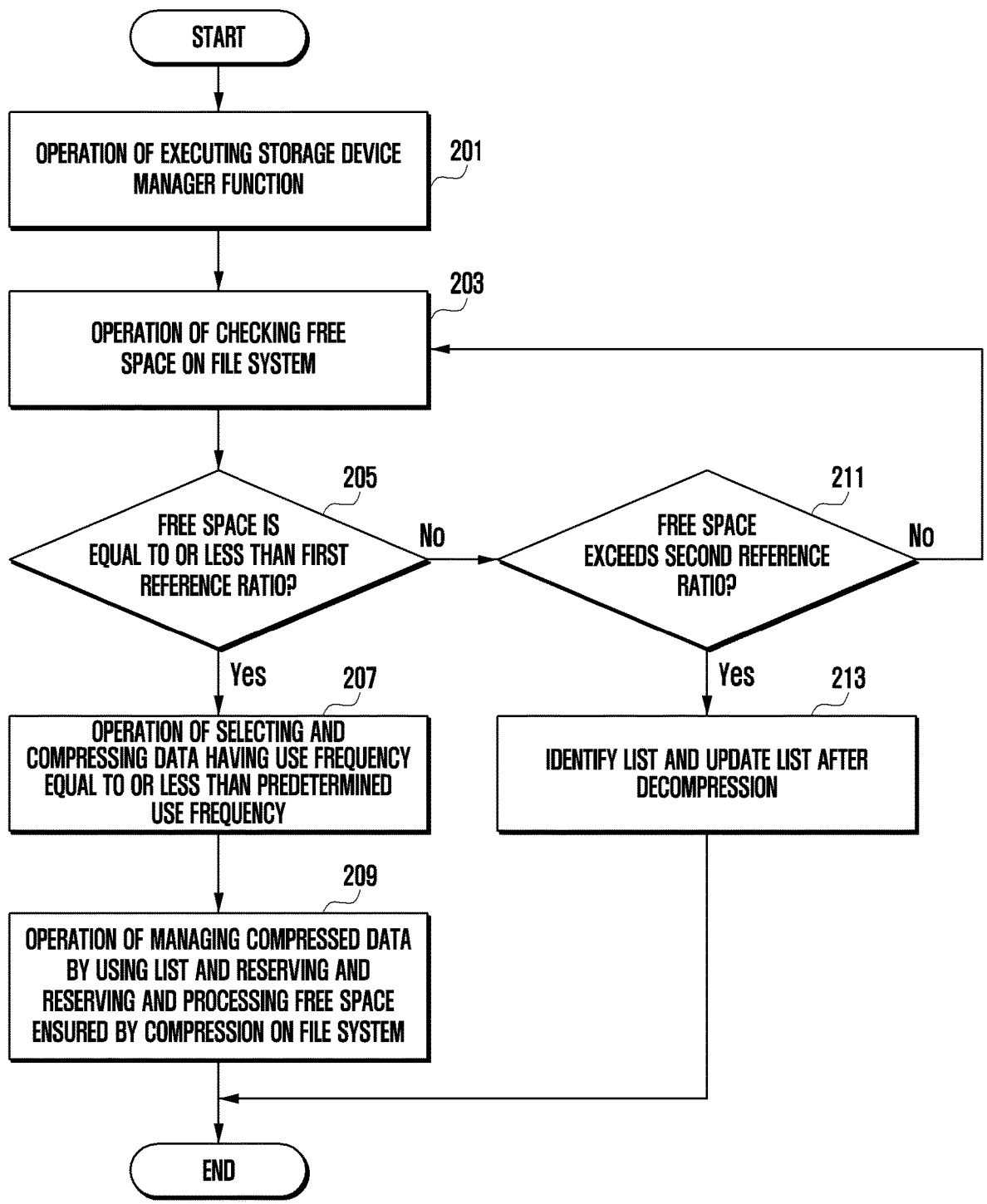
FIG. 2 is a flowchart illustrating a storage management operation of an electronic device according to an embodiment of the disclosure.

FIG. 2 is a flowchart illustrating a storage management operation of an electronic device according to an embodiment of the disclosure.

Referring to FIG. 2, an electronic device 101 may perform a storage device manager (e.g., storage manager) function in operation 201 under the control of a processor 120.

In the embodiment of the disclosure, the storage device manager (e.g., storage manager) may execute an instruction (ioctl) to identify a free space of a file system and perform compression.

The electronic device 101 may perform an operation of checking the free space on the file system stored in the storage in operation 203 under the control of the processor 120.

In the embodiment of the disclosure, the electronic device 101 may perform the operation of periodically checking the free space on the file system stored in the storage in operation 203 under the control of the processor 120.

In the embodiment of the disclosure, the electronic device 101 may perform the operation of checking the free space on the file system stored in the storage based on a designated event (or designated condition) (e.g., writing data, locking screen, entering standby mode, or exiting application) in operation 203 under the control of the processor 120. In the embodiment of the disclosure, the electronic device 101 may perform the operation of checking the free space on the file system stored in the storage when the storage device manager (e.g., storage manager) function is performed under the control of the processor 120. The file system may manage physical materials of the file or data stored in the storage (e.g., a memory 130) of the electronic device 101.

In the embodiment of the disclosure, the storage may be a non-volatile memory 134. For example, the storage (e.g., the memory 130) may be an NAND flash memory or a storage device (e.g., SSD, universal flash storage (UFS), embedded multimedia card (eMMC)) based on an NAND flash memory.

In the embodiment of the disclosure, the storage may include one or more file systems. A total amount of the free space of the storage may be equal to a sum of a total amount of file system free spaces included in the storage and a reserved space included in the storage. The storage device manager may be an interface related to storage service. The storage device manager may provide an interface to allow the file system to manage and access file or data, assign a storage space, and/or identify data integrity.

In the embodiment of the disclosure, the electronic device 101 may perform the storage device manager function in case that a predetermined time and/or a predetermined condition is satisfied. The electronic device 101 may analyze a use time of the electronic device 101 and select an idle time of the electronic device 101 as a predetermined time. The electronic device 101 may select available electric power of the electronic device 101 as a predetermined condition to manage the storage. For example, the electronic device 101 may select a case in which the available electric power is equal to or higher than predetermined electric power as a predetermined condition.

In operation 205, under the control of the processor 120, the electronic device 101 may determine whether the result of checking the free space indicates that the free space of the storage (e.g., the memory 130) is equal to or less than a first reference ratio.

The storage device manager may include definition of the first reference ratio, a second reference ratio, and a third reference ratio related to a ratio of the available capacity of the overall capacity of the storage. For example, the first reference ratio may indicate a case in which the available capacity of the overall capacity of the storage is 10%, and the second reference ratio may indicate a case in which the available capacity of the overall capacity of the storage is 15%. The third reference ratio may indicate a case in which the available capacity of the overall capacity of the storage is 5%. The first to third reference ratios may be determined in advance by a manufacturer.

In the embodiment of the disclosure, the storage device manager may define the first reference ratio and the third reference ratio so that the first reference ratio and the third reference ratio are equal to each other. Alternatively, the storage device manager may not define the third reference ratio.

In the embodiment of the disclosure, the storage device manager may define the ratios so that the second reference ratio is larger than the first reference ratio.

In the embodiment of the disclosure, the storage device manager may define the ratios so that the second reference ratio is larger than the first reference ratio, and the first reference ratio is larger than the third reference ratio.

Under the control of the processor 120, the electronic device 101 may perform the operation from operation 205 to operation 207 when the free space of the storage (e.g., the memory 130) is equal to or less than the first reference ratio.

Under the control of the processor 120, the electronic device 101 may perform the operation from operation 205 to operation 211 when the free space of the storage (e.g., the memory 130) exceeds the first reference ratio.

When the free space of the storage (e.g., the memory 130) is equal to or less than the first reference ratio, the electronic device 101 may select and compress data having a use frequency equal to or less than a predetermined use frequency in operation 207 under the control of the processor 120.

The data having a use frequency equal to or less than the predetermined use frequency may be a cold file having a low access frequency after the data are stored in the storage (e.g., the memory 130). The data having a use frequency equal to or less than the predetermined use frequency may be data unused for a predetermined period (e.g., 15 days).

The electronic device 101 may select the data having a use frequency equal to or less than the predetermined use frequency under the control of the processor 120.

In the embodiment of the disclosure, the storage device manager may select the data having a use frequency equal to or less than the predetermined use frequency under the control of the processor 120. For example, the storage device manager may select an application program package and/or an application executable binary resource as the data having a use frequency equal to or less than the predetermined use frequency.

For example, the application program package may be an android application program package (APK). For example, the application executable binary resource may be a dex, vdex, so files.

In various embodiments of the disclosure, the storage device manager may select user data and/or application cache as the data having a use frequency equal to or less than the predetermined use frequency.

In various embodiments of the disclosure, the electronic device 101 may select the data having a use frequency equal to or less than the predetermined use frequency in a state in which a background task is operated under the control of the processor 120. Under the control of the processor 120, the electronic device 101 may select the data having a use frequency equal to or less than the predetermined use frequency in a background task state.

The electronic device 101 may compress the data having a use frequency equal to or less than the predetermined use frequency selected by using a system call on the storage (e.g., the memory 130) under the control of the processor 120. For example, the system call may be an ioctl system call.

Under the control of the processor 120, the electronic device 101 issues a system call to allow the storage manager to perform compression, and the file system receiving the system call may perform a storage compression operation. The storage may store data compressed by the file system.

In various embodiments of the disclosure, the storage device manager may compress the data having a use frequency equal to or less than the predetermined use frequency selected by using a system call on the storage (e.g., the memory 130) under the control of the processor 120.

Under the control of the processor 120, the electronic device 101 may compress the data having a use frequency equal to or less than the predetermined use frequency on the storage (e.g., the memory 130) based on a predetermined time and/or a predetermined condition.

The predetermined time may be an idle time of the electronic device 101. The electronic device 101 may determine the idle time of the electronic device 101 by analyzing the use time of the electronic device 101 and determine the idle time in response to a user selection. The predetermined condition may be a case in which the available electric power of the electronic device 101 is equal to or higher than predetermined electric power.

In various embodiments of the disclosure, under the control of the processor 120, the storage device manager may compress the data having a use frequency equal to or less than the predetermined use frequency on the storage (e.g., the memory 130) by using a predetermined time schedule.

Under the control of the processor 120, in operation 209, the electronic device 101 may manage the compressed data by using a list, and a block ensured by the compression may be reserved and processed on the file system. The storage device, such as an NAND flash storage and/or an SSD included in the electronic device 101, manages data for each block, and the block may include a plurality of pages.

In various embodiments of the disclosure, under the control of the processor 120, in operation 209, the electronic device 101 may manage the compressed data by using the list, and the block ensured by the compression is reserved and processed on the file system and processed to be unavailable on an application program. In this case, the block ensured by the compression is unavailable on the application program, but the free space may increase on the storage (e.g., the memory 130).

Under the control of the processor 120, in operation 211, the electronic device 101 may determine whether the free space of the storage (e.g., the memory 130) exceeds the second reference ratio.

Under the control of the processor 120, the electronic device 101 may perform the operation from operation 211 to operation 213 when the free space of the storage (e.g., the memory 130) exceeds the second reference ratio.

Under the control of the processor 120, the electronic device 101 may perform the operation from operation 211 to operation 203 when the free space of the storage (e.g., the memory 130) is equal to or less than the second reference ratio.

When the free space of the storage (e.g., the memory 130) exceeds the second reference ratio, the electronic device 101 may identify the list in operation 213 under the control of the processor 120 and update the list after the decompression.

In various embodiments of the disclosure, under the control of the processor 120, in operation 213, the electronic device 101 may decompress the compressed data by using the reserved and processed block (e.g., reserve block) and update the list by eliminating the decompressed data from the list.

In various embodiments of the disclosure, under the control of the processor 120, the electronic device 101 may perform the decompression by using the block (e.g., reserve block) reserved and processed on the compressed data by using the system call. For example, the system call may be an ioctl system call.

In various embodiments of the disclosure, under the control of the processor 120, the storage device manager may perform the decompression by using the block (e.g., reserve block) reserved and processed on the compressed data by using the system call.

Figure 3:
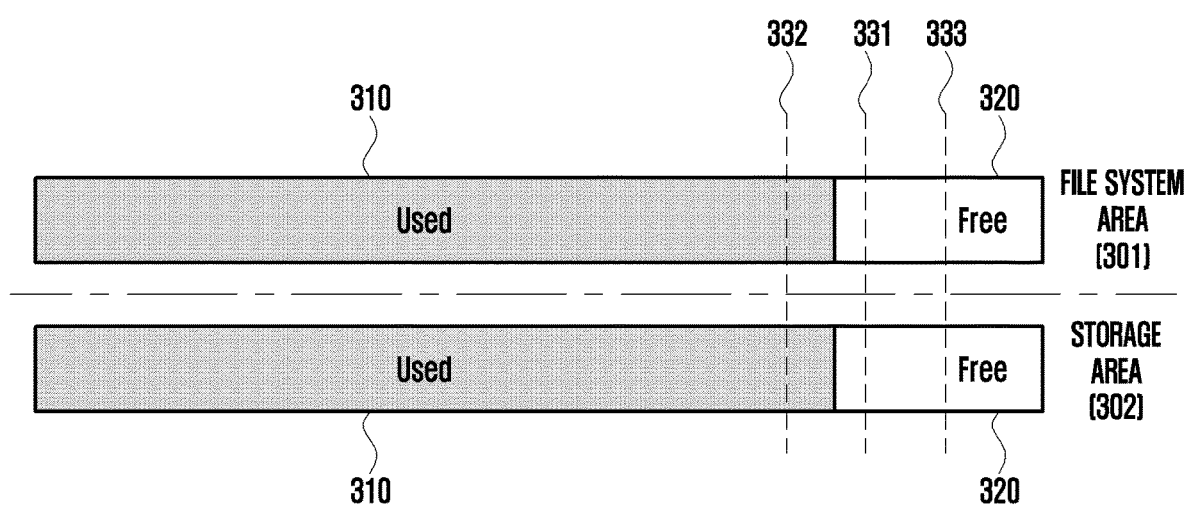
FIG. 3 is a view illustrating a storage management method of an electronic device according to an embodiment of the disclosure.

FIG. 3 is a view illustrating a storage management method of an electronic device according to an embodiment of the disclosure.

Referring to FIG. 3, 301 may indicate a file system area, and 302 may indicate a storage area. A total storage capacity may include a used space 310 and a free space 320.

The file system area 301 may be a logically represented area that an operating system (a file system manager 1130) constitutes on a dynamic random access memory (DRAM) to manage a metadata area and/or a file data area stored in the storage area 302. The file system area 301 may be defined as the metadata area and/or the file data area logically continuous while corresponding to areas divided into the metadata area and/or the file data area stored at positions defined on the physical storage device (e.g., storage). The file system area 301 may be a storage area viewed from the application or operating system.

The storage area 302 may be an area in which data are stored in the storage device (e.g., SSD, UFS, eMMC). The storage area 302 may be an area in which data stored through the file system is physically written.

In various embodiments of the disclosure, the storage area 302 may be an on-disc file system data area stored in the storage. The storage device manager may include definition of a first reference ratio 331, a second reference ratio 332, and a third reference ratio 333 related to a ratio of the available capacity of the overall capacity of the storage. For example, the first reference ratio 331 may indicate a case in which the available capacity of the overall capacity of the storage is 10%, and the second reference ratio 332 may indicate a case in which the available capacity of the overall capacity of the storage is 15%. The third reference ratio 333 may indicate a case in which the available capacity of the overall capacity of the storage is 5%.

Referring to FIG. 3, the electronic device 101 does not compress or decompress data because the free space 320 is less than the first reference ratio 331 and exceeds the second reference ratio 332.

Figure 4:
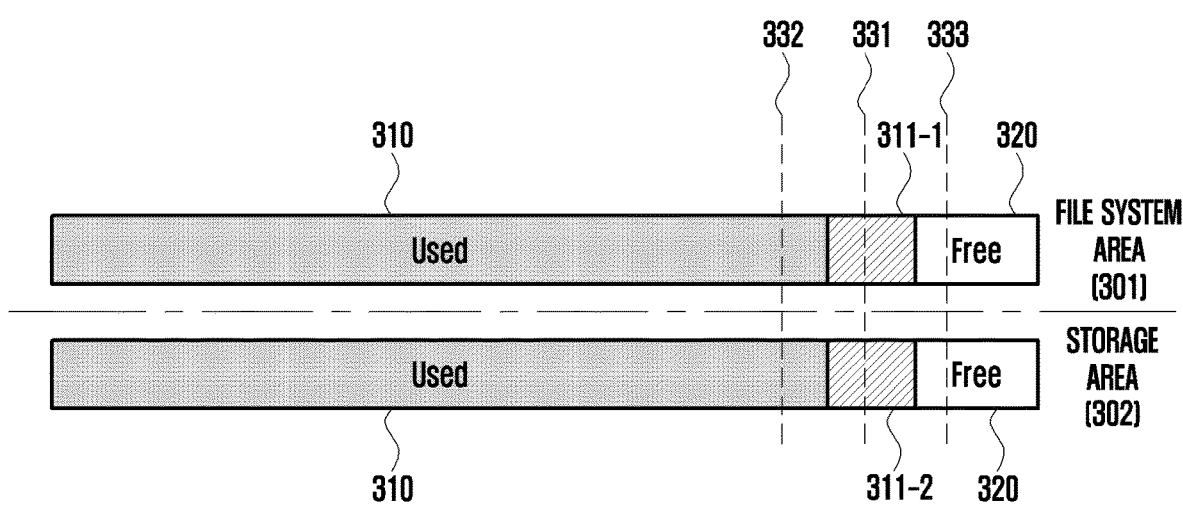
FIG. 4 is a view illustrating a case in which new files and/or data are stored in a storage in FIG. 3 and an available capacity of an overall capacity of the storage is equal to or less than a first reference ratio according to an embodiment of the disclosure.

FIG. 4 is a view illustrating a case in which new files and/or data are stored in a storage and an available capacity of an overall capacity of a storage is equal to or less than a first reference ratio according to an embodiment of the disclosure.

Figure 5:
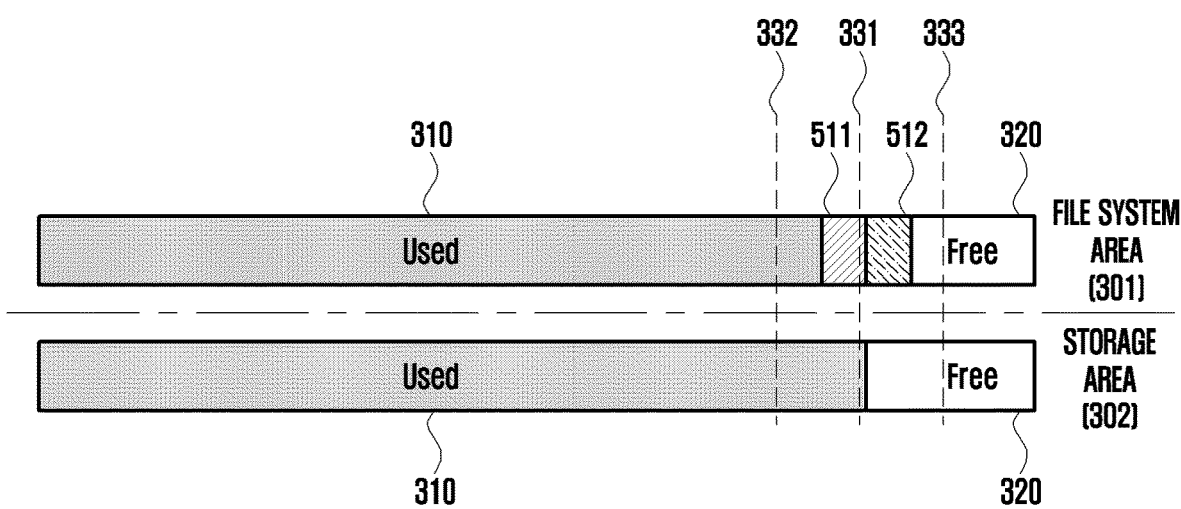
FIG. 5 is a view illustrating an operation of an electronic device in case that an available capacity of an overall capacity of a storage is equal to or less than a first reference ratio according to an embodiment of the disclosure.

FIG. 5 is a view illustrating an operation of an electronic device in case that an available capacity of an overall capacity of a storage is equal to or less than a first reference ratio according to an embodiment of the disclosure.

Referring to FIG. 4, new files and/or data are stored as new files and/or data on the storage area 302 and stored as new files and/or data 311-1 on the file system 301. However, the new files and/or data may be actually the same file. The new files and/or data 311-1 and 311-2 may be stored in the storage (e.g., the memory 130), and the available capacity of the overall capacity of the storage may be equal to or less than the first reference ratio 331.

Referring to FIG. 5, when the available capacity of the overall capacity of the storage is equal to or less than the first reference ratio 331, the electronic device 101 may select and compress the data having a use frequency equal to or less than the predetermined use frequency and manage compressed data 511 by using the list. A block 512 ensured by the compression may be reserved and processed on the file system.

Figure 6:
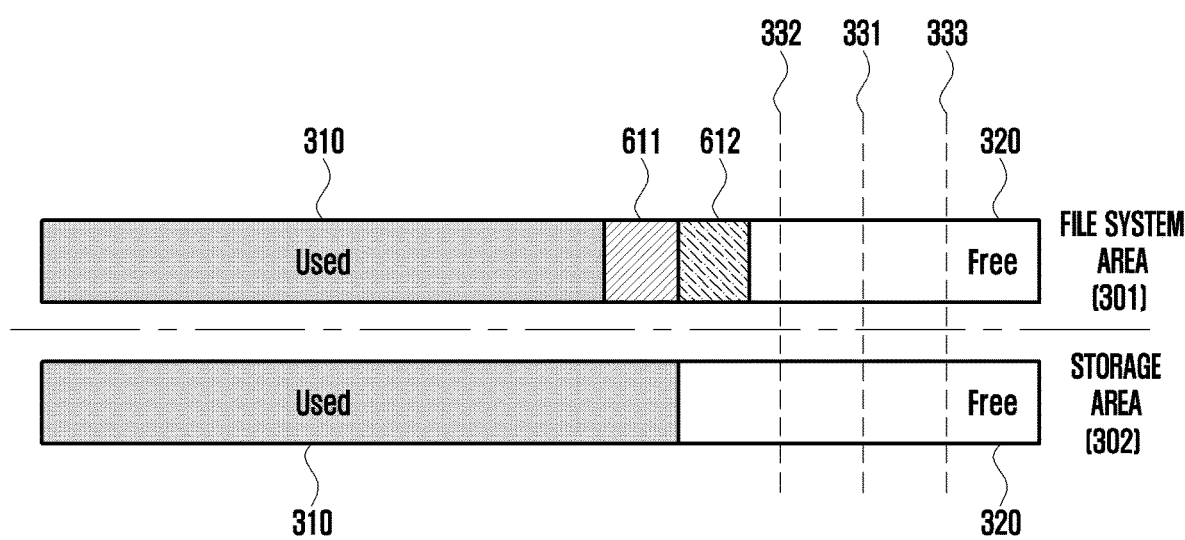
FIG. 6 is a view illustrating a case in which an available capacity of an overall capacity of a storage of an electronic device exceeds a second reference ratio according to an embodiment of the disclosure.

FIG. 6 is a view illustrating a case in which an available capacity of an overall capacity of a storage of an electronic device exceeds a second reference ratio according to an embodiment of the disclosure.

Figure 7:
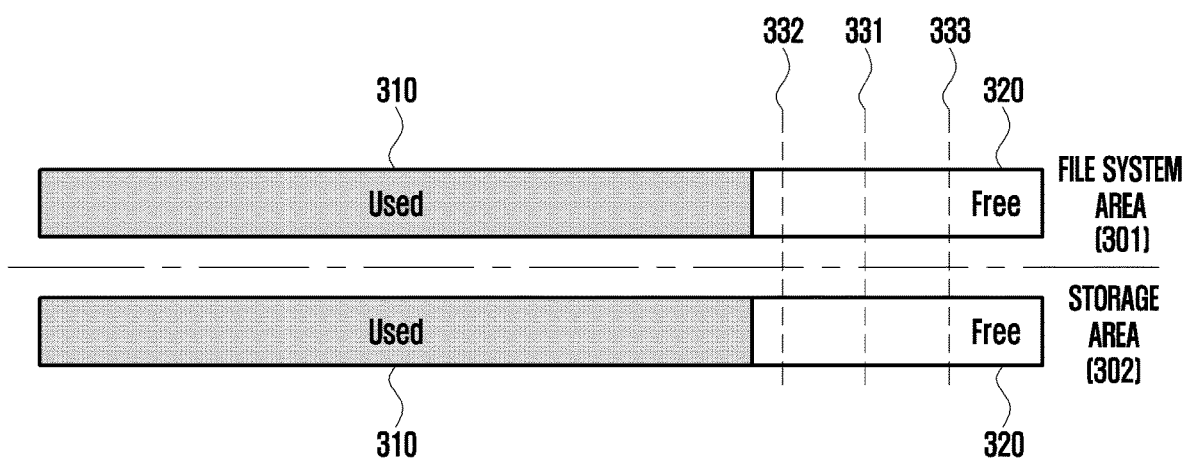
FIG. 7 is a view illustrating an operation of an electronic device in case that an available capacity of an overall capacity of a storage exceeds a second reference ratio according to an embodiment of the disclosure.

FIG. 7 is a view illustrating an operation of an electronic device in case that an available capacity of an overall capacity of a storage exceeds a second reference ratio according to an embodiment of the disclosure.

Referring to FIG. 6, on the file system area 301, the used space 310 may include compressed data 611 and a block 612 ensured by the compression. However, on the storage area 302, the block 612 ensured by the compression may be included in the free space 320. In the file system area 301, the available capacity of the overall capacity of the storage may exceed the second reference ratio 332.

Referring to FIG. 7, the electronic device may decompress the compressed data by using the reserved and processed block (e.g., reserve block) and update the list by eliminating the decompressed data from the list. Referring to FIG. 7, in the storage area 302, the block 612 ensured by the compression is decompressed, such that the free space 320 may decrease.

Figure 8:
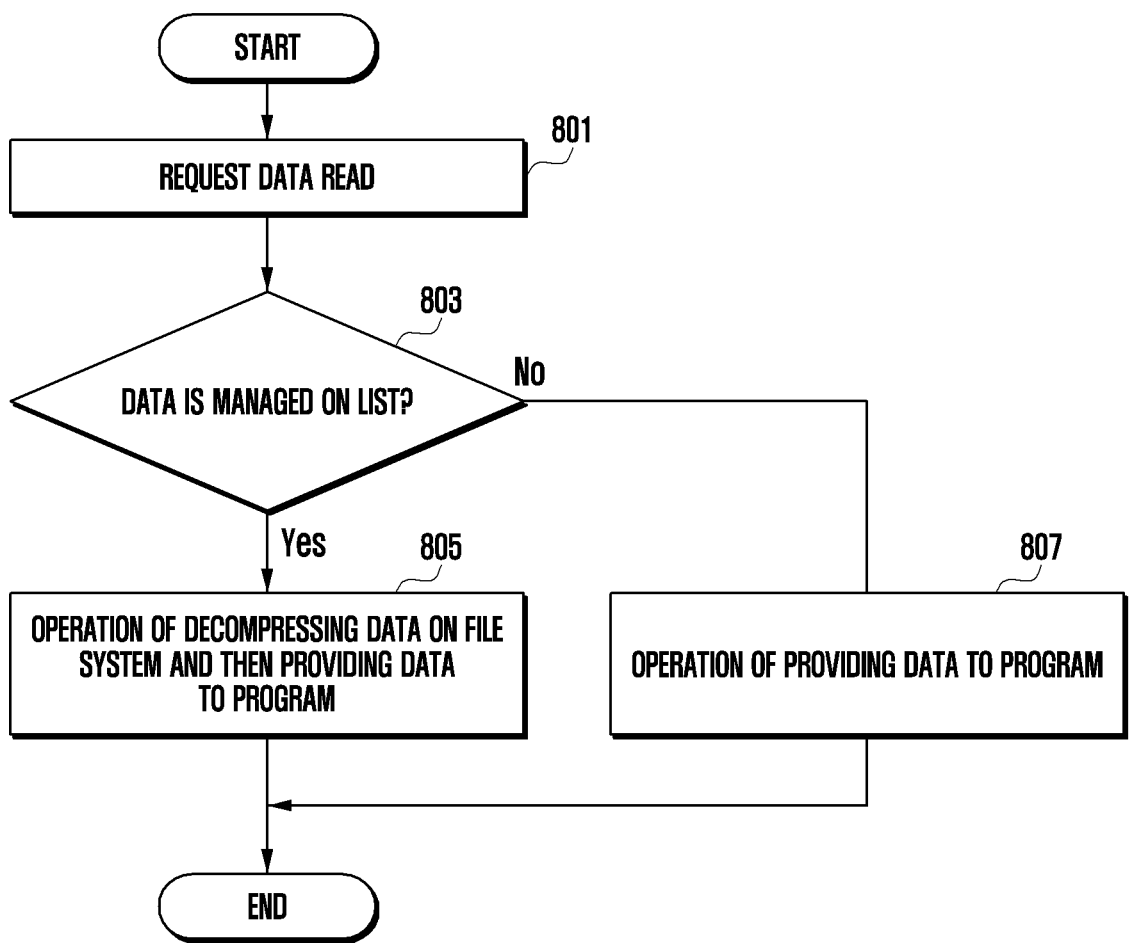
FIG. 8 is a flowchart illustrating a data reading operation of an electronic device according to an embodiment of the disclosure.

FIG. 8 is a flowchart illustrating a data reading operation of an electronic device according to an embodiment of the disclosure.

Referring to FIG. 8, under the control of the processor 120, in operation 801, the electronic device 101 may request to read data. A program (e.g., operating system and/or application), which is being executed in the electronic device 101, may request to read data stored on the storage (e.g., the memory 130). Under the control of the processor 120, the electronic device 101 may receive the request for the read of data stored on the storage (e.g., the memory 130).

Under the control of the processor 120, in operation 803, the electronic device 101 may determine whether the data are data managed on the list when there is the request for the read of data. The data managed on the list may be the compressed data mentioned in the operation in FIG. 2.

Under the control of the processor 120, the electronic device 101 may perform the operation from operation 803 to operation 805 when the data are the data managed on the list.

Under the control of the processor 120, the electronic device 101 may perform the operation from operation 803 to operation 807 when the data are not the data managed on the list.

Under the control of the processor 120, in operation 805, the electronic device 101 may decompress the data managed on the list and then provide the data to the program. In this case, the data decompressed on the list are not eliminated or updated, such that the data are kept compressed even after the data are provided to the program.

Under the control of the processor 120, in operation 805, the electronic device 101 may store the data, which are decompressed by the file system, in a volatile memory 132 and then provide the data to the application when the application reads the data stored in the compressed state. Therefore, the compressed data stored in the storage may be kept compressed.

Under the control of the processor 120, in operation 807, the electronic device 101 may provide the data to the program.

Figure 9:
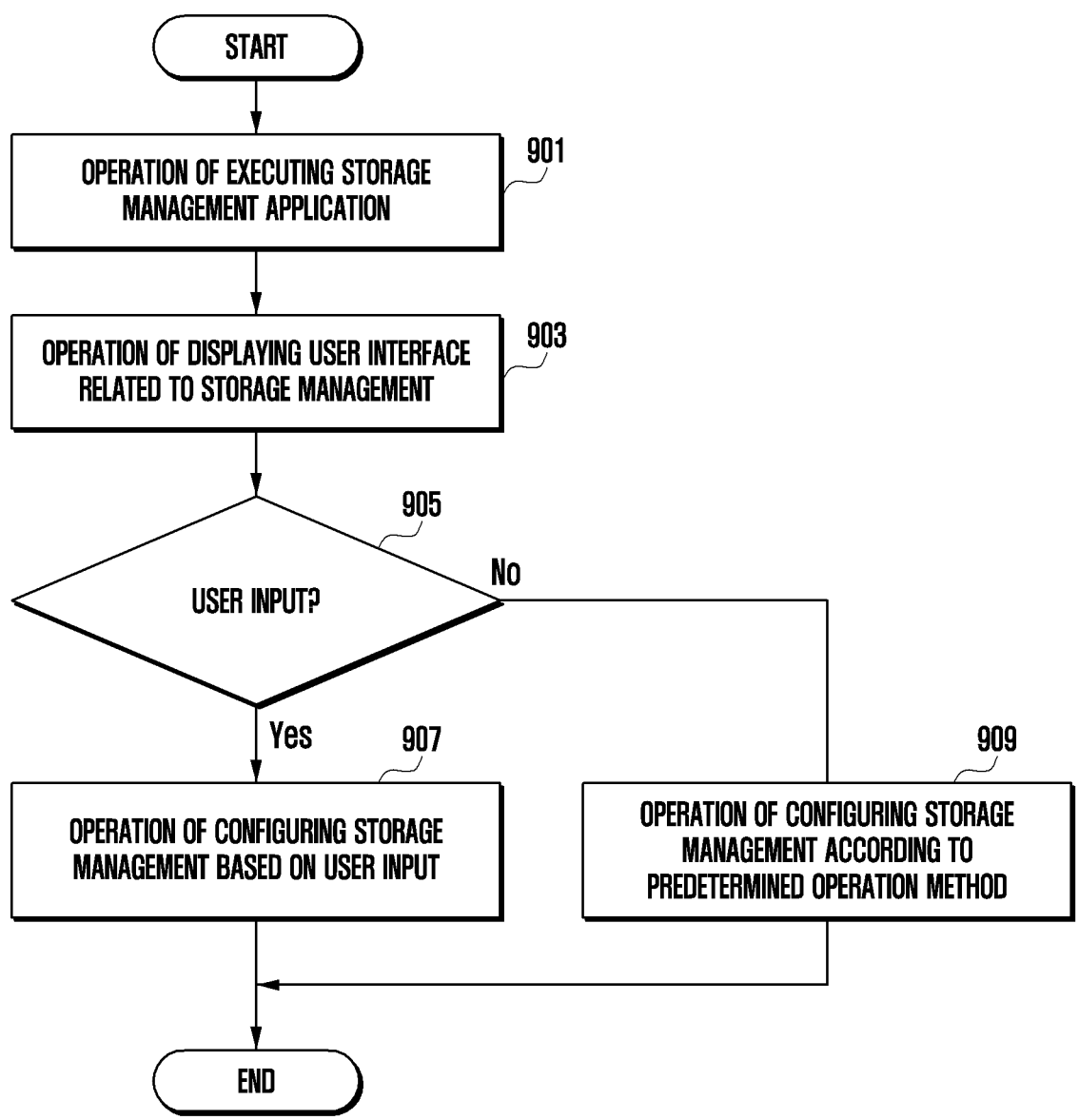
FIG. 9 is a view illustrating a storage management configuration method of an electronic device according to an embodiment of the disclosure.

FIG. 9 is a view illustrating a storage management configuration method of an electronic device according to an embodiment of the disclosure.

Referring to FIG. 9, under the control of the processor 120, in operation 901, the electronic device 101 may execute a storage management application.

In various embodiments of the disclosure, under the control of the processor 120, in operation 901, the electronic device 101 may execute the storage management application by the user input.

Under the control of the processor 120, in operation 903, the electronic device 101 may display a user interface related to the storage management.

Under the control of the processor 120, in operation 905, the electronic device 101 may determine whether the electronic device 101 receives the user input on the user interface related to storage management.

Under the control of the processor 120, the electronic device 101 may perform the operation from operation 905 to operation 907 when the electronic device 101 receives the user input on the user interface related to the storage management.

Under the control of the processor 120, the electronic device 101 may perform the operation from operation 905 to operation 909 when the electronic device 101 does not receive the user input on the user interface related to the storage management.

Under the control of the processor 120, in operation 907, the electronic device 101 may configure the storage management based on the user input.

Under the control of the processor 120, in operation 909, the electronic device 101 may configure the storage management in accordance with a predetermined way.

The configuration of the storage management may be a configuration related to whether to activate the compression function and/or a configuration related to a compression function performing time.

Figure 10:
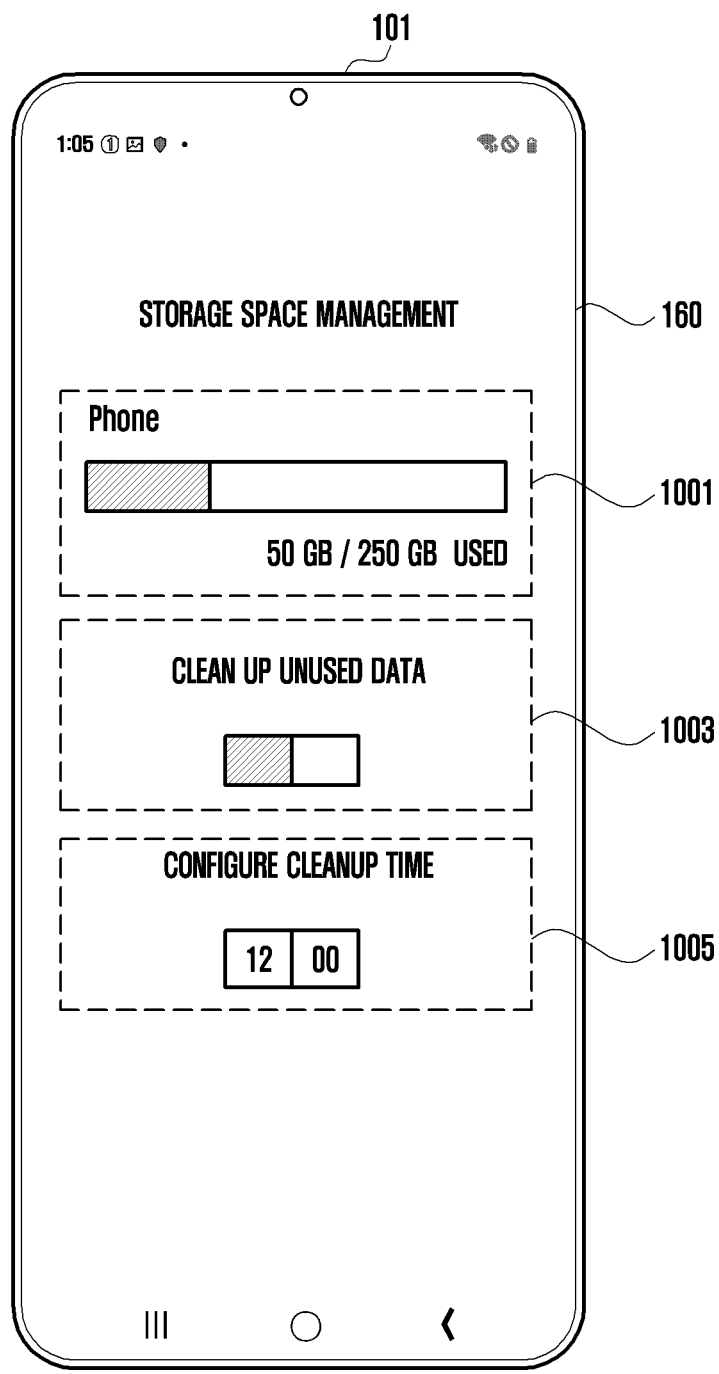
FIG. 10 is a view illustrating a user interface related to a storage management configuration of an electronic device in FIG. 9 according to an embodiment of the disclosure.

FIG. 10 is a view illustrating a user interface related to a storage management configuration of an electronic device according to an embodiment of the disclosure.

Referring to FIG. 10, when the storage management application is executed by the user input, the electronic device 101 may display the user interface related to the storage management on a display module 160.

The user interface related to the storage management may include a user interface 1001 related to a total capacity of the storage and a used capacity, a user interface 1003 related to a configuration of whether to activate the compression function, and/or a user interface 1005 related to the compression function performing time. The user interface 1003 related to the configuration of whether to activate the compression function may include images and/or icons related to activation On/Off of the compression function. The user interface 1005 related to the compression function performing time may include a picker having a clock shape related to the configuration of time.

Figure 11:
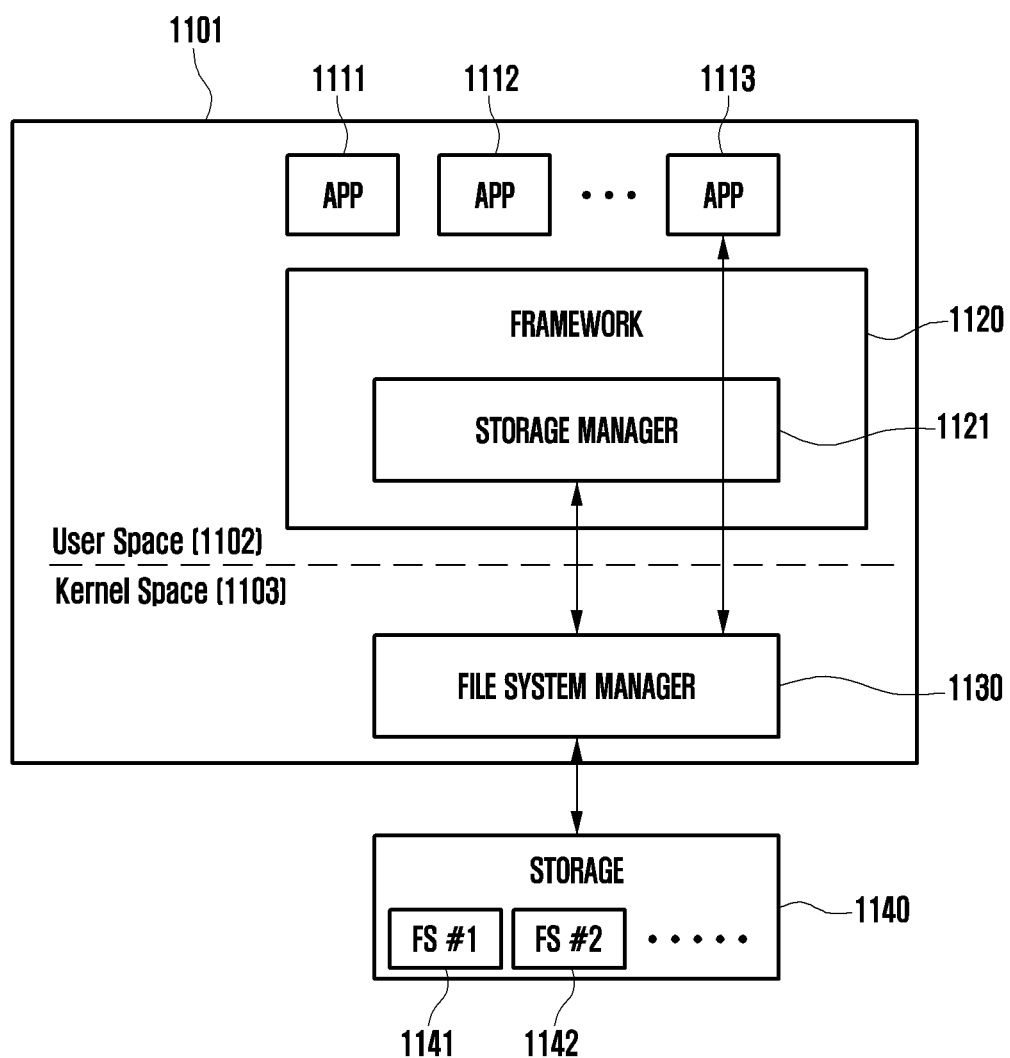
FIG. 11 is a view illustrating an operation between software and a device of an electronic device according to an embodiment of the disclosure.

FIG. 11 is a view illustrating an operation between software and a device of an electronic device according to an embodiment of the disclosure.

Referring to FIG. 11, a program 1101 (e.g., the program 140 in FIG. 1) may include a user space 1102 and a kernel space 1103.

The user space 1102 may include one or more applications 1111, 1112, and 1113 and a framework 1120. The framework 1120 may include a storage manager 1121. The kernel space 1103 may include the file system manager 1130.

The file system manager 1130 may be a kernel file system. The file system manager 1130 may be a part of an operating system capable of performing an input/output control operation that connects the user space and the kernel area, managing and accessing files or data, assigning a storage space, and/or identifying data integrity.

A storage 1140 (e.g., an NAND flash-based storage) may include one or more storage devices (e.g., storages). The storage 1140 may include one or more file systems 1141 and 1142. For example, file systems 1141 and 1142 may correspond to the storage area 302 in FIGS. 3 to 7.

The program 1101 may write, compress, decompress, read the data and/or files on the storage 1140 in response to an instruction (e.g., a system call).

The one or more applications 1111, 1112, and 1113 may request to read data and/or files. When a request is made to read data and/or files, the storage 1140 allows the one or more file systems 1141 and 1142 to read the compressed data, decompress the data, and then provide the data to the one or more applications 1111, 1112, and 1113.

The storage manager 1121 may identify the free spaces in the one or more file systems 1141 and 1142 and manage a file and/or android application program package (APK) that is not used often. For example, the storage manager 1121 may request the one or more file systems 1141 and 1142 to compress and/or decompress the file and/or android application program package (APK) that is not used often. In response to a compression and/or decompression request, the one or more file systems 1141 and 1142 may compress and/or decompress the file and/or android application program package (APK) that is stored in the storage 1140 and is not used often.

The electronic device according to various embodiments disclosed in the document may be a device in various forms. The electronic device may include, for example, a portable communication device (e.g., a smartphone), a computer device, a portable multimedia device, a portable medical device, a camera, a wearable device, or a home appliance. The electronic device according to the embodiment of the document is not limited to the above-mentioned devices.

Various embodiments of the document and the terms used in the embodiments are not intended to limit the technical features disclosed in the document to the particular embodiments and should be understood as including various alterations, equivalents, or alternatives of the corresponding embodiments. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). If an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

The term "module" used in various embodiments of the document may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to the embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to the embodiment of the disclosure, a method according to various embodiments disclosed in the document may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PLAYSTORE™), or between two user devices (e.g., smart phones) directly. If distributed online, at least part of the computer program product may be temporarily generated or at least temporarily stored in the machine-readable storage medium, such as a memory of the manufacturer's server, a server of the application store, or a relay server.

According to various embodiments of the disclosure, each constituent element (e.g., module or program), among the above-mentioned constituent elements, may include a single object or a plurality of objects, and some of the plurality of objects may be disposed separately in different constituent elements. According to various embodiments of the disclosure, one or more constituent elements, among the above-mentioned constituent elements, or operations may be omitted, or one or more other constituent elements or operations may be added. Alternatively or additionally, a plurality of components (e.g., modules or programs) may be integrated into a single component. In such a case, the integrated component may perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   storage storing a file system and one or more computer programs;
   and
   one or more processors communicatively coupled to the storage,
   wherein the one or more computer programs include computer-executable instructions that, when executed by the one or more processors individually or collectively, cause the electronic device to:
   execute a storage device manager,
   check a free space on the file system based at least on a termination of an application,
   determine whether a result of the checking of the free space on the file system indicates that free space of the storage is equal to or less than a first reference ratio,
   select and compress data having a use frequency equal to or less than a predetermined use frequency when the free space of the storage is equal to or less than the first reference ratio,
   manage the compressed data by using a list,
   reserve and process a block ensured by compression on the file system, and
   compress the data having a use frequency equal to or less than the predetermined use frequency, and wherein the data having the use frequency equal to or less than the predetermined use frequency is data unused for a predetermined period.

2. The electronic device of claim 1,
wherein a file system manager manages and accesses a file or data stored in the file system of the storage, assigns a storage space, and/or identifies data integrity, and
wherein the storage device manager is an interface related to storage service.

3. The electronic device of claim 1, wherein the data having a use frequency equal to or less than the predetermined use frequency are data which is not used for the predetermined period, or cold files in which access frequency is low after being stored in the storage.

4. The electronic device of claim 1, wherein the data having a use frequency equal to or less than the predetermined use frequency are application program packages and/or application executable binary resources.

5. The electronic device of claim 1, wherein the one or more computer programs further include computer-executable instructions that, when executed by the one or more processors individually or collectively, cause the electronic device to:
select the data having a use frequency equal to or less than the predetermined use frequency in a background task state,
receive a request for a read of data,
determine whether the data are data managed on the list, and
decompress the data managed on the list and then provides the data to a program when the data are the data managed on the list.

6. The electronic device of claim 1,
wherein the one or more computer programs further include computer-executable instructions that, when executed by the one or more processors individually or collectively, cause the electronic device to:
determine whether the free space of the storage exceeds a second reference ratio when the free space of the storage exceeds the first reference ratio,
identify the list,
decompress the reserved and processed block in the compressed data, and
update the list when the free space of the storage exceeds the second reference ratio,
wherein the second reference ratio is larger than the first reference ratio, and
wherein the first reference ratio and the second reference ratio are based on a ratio of an available capacity of an overall capacity of the storage.

7. A method performed by an electronic device, the method comprising:
executing, by the electronic device, a storage device manager;
periodically checking, by the electronic device, a free space on a file system of a storage based at least on a termination of an application;
determining, by the electronic device, whether a result of the checking of the free space on the file system indicates that a free space of the storage is equal to or less than a first reference ratio;
selecting, by the electronic device, and compressing data having a use frequency equal to or less than a predetermined use frequency when the free space of the storage is equal to or less than the first reference ratio;
managing, by the electronic device, the compressed data by using a list; and
reserving and processing, by the electronic device, a block ensured by compression on the file system,
wherein the selecting and compressing of the data having a use frequency equal to or less than the predetermined use frequency further comprises compressing the data having a use frequency equal to or less than the predetermined use frequency, and
wherein the data having the use frequency equal to or less than the predetermined use frequency is data unused for a predetermined period.

8. The method of claim 7,
wherein a file system manager manages and accesses a file or data stored in the file system of the storage, assigns a storage space, and/or identifies data integrity, and
wherein the storage device manager is an interface related to storage service.

9. The method of claim 7, wherein the data having a use frequency equal to or less than the predetermined use frequency are data which is not used for the predetermined period, or cold files in which access frequency is low after being stored in the storage.

10. The method of claim 7, wherein the data having a use frequency equal to or less than the predetermined use frequency are application program packages and/or application executable binary resources.

11. The method of claim 7, wherein the selecting and compressing of the data having a use frequency equal to or less than the predetermined use frequency further comprises selecting the data having a use frequency equal to or less than the predetermined use frequency in a background task state.

12. The method of claim 7, further comprising:
determining whether the free space of the storage exceeds a second reference ratio when the free space of the storage exceeds the first reference ratio; and
identifying the list, decompressing the reserved and processed block in the compressed data, and then updating the list when the free space of the storage exceeds the second reference ratio,
wherein the second reference ratio is larger than the first reference ratio, and
wherein the first reference ratio and the second reference ratio are based on a ratio of an available capacity of an overall capacity of the storage.

13. The method of claim 7, further comprising:
receiving a request for a read of data;
determining whether the data are data managed on the list; and
decompressing the data managed on the list and then providing the data to a program when the data are the data managed on the list.

14. One or more non-transitory computer-readable storage media storing one or more computer programs including computer-executable instructions that, when executed by one or more processors of an electronic device individually or collectively, cause the electronic device to perform operations, the operations comprising:
executing, by the electronic device, a storage device manager;
periodically checking, by the electronic device, a free space on a file system stored on a storage based at least on a termination of an application;

determining, by the electronic device, whether a result of checking the free space indicates that the free space of a storage is equal to or less than a first reference ratio;

selecting, by the electronic device, and compressing data having a use frequency equal to or less than a predetermined use frequency when the free space of the storage is equal to or less than the first reference ratio;

managing, by the electronic device, the compressed data by using a list; and reserving and processing, by the electronic device, a block ensured by compression on the file system, wherein the selecting and compressing of the data having a use frequency equal to or less than the predetermined use frequency further comprises compressing the data having a use frequency equal to or less than the predetermined use frequency, and wherein the data having the use frequency equal to or less than the predetermined use frequency is data unused for a predetermined period.

* * * * *